United States Patent [19]  
Taborsky

[11] 3,929,879  
[45] Dec. 30, 1975

[54] 3-NITROHALOSALICYLANILIDES

[75] Inventor: Robert G. Taborsky, Bedford Heights, Ohio

[73] Assignee: Ben Venue Laboratories, Inc., Bedford, Ohio

[22] Filed: May 20, 1968

[21] Appl. No.: 730,596

Related U.S. Application Data

[63] Continuation-in-part of Ser. No. 469,300, July 2, 1965, abandoned, which is a continuation-in-part of Ser. Nos. 325,473, Nov. 21, 1963, abandoned, and Ser. No. 435,686, Feb. 26, 1965, abandoned, each is a continuation-in-part of Ser. No. 56,679, Sept. 19, 1960, abandoned.

[52] U.S. Cl. ............... 260/559 S; 210/64; 424/59; 424/324
[51] Int. Cl.² ..................................... C07C 103/76
[58] Field of Search ................................. 260/559 S

[56] References Cited
UNITED STATES PATENTS

| | | | |
|---|---|---|---|
| 3,079,297 | 2/1963 | Schraufstatter et al. | 260/559 S |
| 3,113,067 | 12/1963 | Strufe et al. | 260/559 S |
| 3,238,098 | 3/1966 | Howell et al. | 424/230 |

OTHER PUBLICATIONS

Ioffe et al. I Zhur. Obshihei Khim. Vol. 29, pp. 2682–2685 (1959, Aug. 1959).

Ioffe et al. II Chem. Abst. Vol. 54, Column 10938 (1960).

*Primary Examiner*—Natalie Trousof
*Attorney, Agent, or Firm*—Cain and Lobo

[57] ABSTRACT

3-Nitrohalosalicylanilides having one or more halogen substitutions on the aniline ring which compounds have selective activity against brown bullheads and larvae of sea lamprey as opposed to rainbow trout and also have anti-radiation activity and activity against certain fungi.

9 Claims, No Drawings

3-NITROHALOSALICYLANILIDES

CROSS-REFERENCES TO RELATED APPLICATIONS

This application is a continuation-in-part of applicant's copending application Ser. No. 469,300 filed July 2, 1965, now abandoned which was a continuation-in-part of applicant's then copending applications, Ser. No. 325,473, filed Nov. 21, 1963, now abandoned and Ser. No. 435,686 filed Feb. 26, 1965, now abandoned, each of which was continuation-in-part application of applicant's then copending application, Ser. No. 56,679 filed Sept. 19, 1960, now abandoned.

BACKGROUND OF THE INVENTION

1. Field of Invention

This invention relates to new substituted salicylanilides and more particularly to new nitrohalosalicylanilides, to wit 3-nitrohalosalicylanilides, which compounds exhibit new, unobvious and unexpected beneficial and useful characteristics over the 5-nitro-4′-chlorosalicylanilide known to the prior art.

2. Description of the Prior Art

The only nitrohalosalicylanilide known to the prior art is 5-nitro-4′-chlorosalicylanilide. The prior art neither discloses nor suggests 3-nitrohalosalicylanilides which applicant has provided and which exhibit and have unobvious and unexpected properties, characteristics and advantages over the prior art compound, properties, characteristics and advantages which are useful and beneficial and which cannot be obtained or realized by the prior art 5-nitro-4′-chlorosalicylanilide and would not be expected or obvious from the said prior art compound.

SUMMARY OF INVENTION

The general object of this invention is to provide a new and improved substituted salicylanilide having new, unexpected and unobvious beneficial and useful results, characteristics and advantages over prior art compounds.

A further object of this invention is to provide 3-nitrohalosalicylanilides.

These and other objects and advantages of this invention will become apparent from the following description of preferred forms thereof.

DESCRIPTION OF THE PREFERRED EMBODIMENTS

Broadly, the new substituted salicylanilides which are provided by this invention correspond to the following formula:

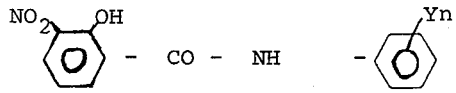

wherein Y is a halogen and $n$ is a positive integer no greater than 5. In another broad form of this invention $n$ is a positive integer no greater than 3.

The following are specific examples of new 3-nitrohalosalicylanilides provided by and embodying this invention and having corrected melting points in degrees centigrade as listed,

TABLE I

| Compound | M. P. *°C | Formula |
| --- | --- | --- |
| 3-nitro-4′-Fluorosalicylanilide | 141.5–142 | $C_{13}H_9FN_2O_4$ |
| 3-nitro-2′-Chlorosalicylanilide | 171.5–172.5 | $C_{13}H_9ClN_2O_4$ |
| 3-nitro-3′-Chlorosalicylanilide | 152.5–153.5 | $C_{13}H_9ClN_2O_4$ |
| 3-nitro-4′-Chlorosalicylanilide | 154–156 | $C_{13}H_9ClN_2O_4$ |
| 3-nitro-4′-Bromosalicylanilide | 158–158.5 | $C_{13}H_9BrN_2O_4$ |
| 3-nitro-4′-Iodosalicylanilide | 175–178 | $C_{13}H_9IN_2O_4$ |
| 3-nitro-2′,4′-Dichlorosalicylanilide | 241 | $C_{13}H_8Cl_2N_2O_4$ |

*Corrected 3-nitrohalosalicylanilides embodying this invention may be produced by a number of methods including, for example, reacting 3-nitrosalicoyl chloride with an excess of the halogenated aniline in benzene and recrystallizing or by reacting the acid, the aniline and phosphorous trichloride in benzene.

EXAMPLE I

A solution of 25 grams (0.12 mole) of 3-nitrosalicoyl chloride in 200 milliliters of benzene was added with shaking to 50 grams (0.39 mole) of para-chloroaniline in 150 milliliters of benzene. An immediate yellow precipitate formed which was allowed to stand over night and then vacuum filtered. The solid obtained was washed with small amounts of benzene, air dried, pulverized, and then stirred for 30 minutes in 100 milliliters of 10% hydrochloric acid. The product was then vacuum filtered again, washed well with water, and dried at 90° for 16 hours to give 28.5 grams (78.5% yield) of crude 3-nitro-4′-chlorosalicylanilide, having a melting point of 153°–156°C. The crude 3-nitro-4′-chlorosalicylanilide was crystallized from 600 milliliters of ethanol to give 23.0 grams of yellow needles in a first crop and additional 3.6 grams by reducing the alcohol filtrate to one-sixth, or a total of 26.6 grams of 3-nitro-4′-chlorosalicylanilide having a melting point of 154°–156°C.

The other 3-nitrohalosalicylanilides provided by this invention, when prepared in accordance with the procedure of this example, were obtained in molar yields of from 71 to 93%.

EXAMPLE II

Similarly, 5.0 grams (0.025 mole) of 3-nitrosalicoyl chloride were reacted with 9.2 grams (0.083 mole) of parafluoroaniline for 18 hours in benzene to give 3-nitro-4′-fluorosalicylanilide having a melting point of 141.5°–142° upon crystallization from ethanol.

EXAMPLE III

Similarly, 5.0 grams (0.025 mole) of 3-nitrosalicoyl chloride were reacted with 10.6 grams (0.083 mole) of orthochloroaniline in benzene to give 3-nitro-2′-chlorosalicylanilide, having a melting point of 171.5°–172.5° upon crystallization from ethanol.

EXAMPLE IV

Similarly, 5.0 grams (0.025 mole) of 3-nitrosalicoyl chloride were reacted with 10.6 grams (0.083 mole) of metachloroaniline in benzene to give 3-nitro-3'-chlorosalicylanilide, having a melting point of 152.5°–153.5° upon crystallization from ethanol.

EXAMPLE V

Similarly, 5.0 grams (0.025 mole) of 3-nitrosalicoyl chloride and 14.3 grams (0.083 mole) of para-bromoaniline were reacted in benzene for 18 hours to give 3-nitro-4'-bromosalicylanilide, having a melting point of 158°–158.5° upon crystallization from ethanol.

EXAMPLE VI

Similarly, 5.0 grams (0.025 mole) of 3-nitrosalicoyl chloride were reacted with 18.2 grams (0.083 mole) of paraiodoaniline in benzene for 18 hours to give 3-nitro-4'-iodosalicylanilide, having a melting point of 175°–178° upon crystallization from ethanol.

EXAMPLE VII

Similarly, 5.0 grams (0.025 mole) of 3-nitrosalicoyl chloride were reacted with 13.4 grams (0.083 mole) of 2,4-dichloroaniline for 18 hours in benzene to give 3-nitro-2', 4'-dichlorosalicylanilide, having a melting point of 241°.

When 2, 4-dichloroaniline reacted with the nitrosalicoyl chloride, the rate of reaction was slower than with the monohaloanilines and precipitate did not start to form until about 1 hour after mixing and did not fill the mixture until several hours later. With the monohaloanilines, precipitation occurred immediately and satisfactory yields were obtained in about 1 hour after mixing.

As noted above, 3-nitrohalosalicylanilides, embodying this invention have and have exhibited, both generally and specifically, unexpected and unobvious useful and beneficial advantages and results over the 5-nitro-4'-chlorosalicylanilide of the prior art, as well as over other 5-nitrohalosalicylanilides which are not disclosed nor suggested in the prior art.

Thus, for example, 3-nitro-4'-iodosalicylanilide exhibits great and unexpected selectivity as between brown bullheads (*Ictalurus nebulosus*) and rainbow trout (*Salmo gairdneri*) being 40 times more lethal to the brown bullheads than to the rainbow trout. Further, and even more unobvious and unexpected, 3-nitro-4'-iodosalicylanilide exhibits piscicidal activity at low temperatures taking, for example, only twice as long to completely eradicate the aforesaid brown bullheads at 47°F as at 70°, for equivalent concentration.

Neither selective activity nor activity at such low tempertures is evidenced by the aforesaid prior art 5-nitro-4'-chlorosalicylanilide.

3-nitrohalosalicylanilides provided by this invention have also been found unexpectedly and unobviously useful and advantageous as selective larvicides for sea lamprey. In recent years sea lamprey have caused great damage to commercial fish in the Great Lakes and much money, time and effort has been expended in seeking a practical way to eradicate or control the sea lamprey without, however, causing injury or damage to commercially useful fish and other aquatic life and users of the water. Lamprey reproduce by laying their eggs in the streams which feed the lakes, and it has been proposed to control the lamprey by killing the larvae, which are hatched from the eggs, in the streams.

Such larvicides must, of course, be capable of killing the larvae, one hundred percent, in reasonable concentrations, in a reasonable time and at a rational cost and have no residual or toxic effect, as used, against human and other animals. Equally important, the difference between the concentrations of the larvicide, which will be completely effective against the sea lamprey larvae and which appreciably kill economically valuable fish, should be as great as possible, so as to provide the best possible margin of safety between the two concentrations. It is desired therefore to provide more potent and selective sea lamprey larvicides.

Sea lamprey live as parasites on beneficial fish and annual losses caused the Great Lakes fishing industry by the lamprey have risen above 7.5 million dollars. In Lake Superior, alone, the annual trout harvest dropped from 47 million pounds in 1950 to 367,000 in 1961.

Certain of the above and other nitrohalosalicylanilides have been tested for toxic and selective effect on sea lamprey larvae and Rainbow trout. In making the tests, larval sea lamprey (*Petromyzon marinus*) and fingerling rainbow trout (*Salmo gairdneri*) were exposed for 24 hours at 12°C. in battery jars containing varying concentrations in parts per millions of the test compound dissolved in aerated water drawn from Lake Huron. Viability was determined at the conclusion of the test period. The effectiveness of the compound against sea lamprey larvae was determined on the basis of a one hundred percent kill. In contrast, the effectiveness of the compound against trout was determined for a concentration which would not kill in excess of 25% of a given population, since a greater kill is not considered desirable with respect to the economically valuable test fish. Preliminary screening eliminated compounds requiring a greater than 10 PPM concentration in order to produce a 100% kill. The concentrations necessary to produce these effects vary with the conditions under which they are used, but the tests are considered valid for determining usefulness.

The following table indicates the parts per million of the respective compounds and mixtures of compounds found necessary to produce a total kill ($LD_{100}$) in sea lamprey larvae and a kill not in excess of 25% ($LD_{25}$) in Rainbow Trout. The activity index expresses the selectivity of the compound for lamprey larvae at $LD_{100}$ to Rainbow Trout at $LD_{25}$ as a mathematical ratio of the concentrations necessary to produce the respective lethal effects — the larger the activity index the greater the selectivity of the compound as a larvicide.

TABLE II

| COMPOUND | Larvicidal $LD_{100}$ | Trout $LD_{25}$ | Activity Index |
|---|---|---|---|
| 3-nitro-2'-chlorosalicylanilide | 3.0 | 7.0 | 2.33 |
| 3-nitro-3'-chlorosalicylanilide | 0.3 | 0.9 | 3.0 |
| 3-nitro-4'-chlorosalicylanilide | 0.3 | 0.9 | 3.0 |
| 3-nitro-2'-fluorosalicylanilide | 3.0 | 3.0 | 1.0 |
| 3-nitro-3'-fluorosalicylanilide | 0.5 | 0.9 | 1.8 |
| 3-nitro-4'-fluorosalicylanilide | 10.0 | 10.0 | — |
| 3-nitro-2'-iodosalicylanilide | 1.0 | 3.0 | 3.0 |
| 3-nitro-3'-iodosalicylanilide | 0.3 | 1.0 | 3.3 |
| 3-nitro-4'-iodosalicylanilide | 0.3 | 0.7 | 2.33 |

TABLE II-continued

| COMPOUND | Larvicidal Trout LD$_{100}$ | LD$_{25}$ | Activity Index |
|---|---|---|---|
| 3-nitro-2'-bromosalicylanilide | 1.0 | 1.0 LD$_{100}$ | — |
| 3-nitro-3'-bromosalicylanilide | 0.3 | 1.0 | 3.3 |
| 3-nitro-4'-bromosalicylanilide | 0.3 | 1.0 | 3.3 |
| 3-nitro-2',5'-dichlorosalicylanilide | 0.3 | 0.9 | 3.0 |
| 3-nitro-3',4'-dichlorosalicylanilide | 0.3 | 0.5 | 1.6 |
| 5-nitro-4'-chlorosalicylanilide (prior art) | 0.5 | 1.0 | 2.0 |

As seen in Table II, 3-nitrohalosalicylanilides not only are lethal to sea lamprey larvae but also provide efficient and effective means for controlling sea lamprey because of the unobvious and unexpected effect of 3-nitrohalosalicylanilides in general, and 3-nitro-4'-halosalicylanilides, in particular, in providing a sea lamprey larvicide effective at low concentration and having a wide selectivity range between lethal effectiveness against the sea lamprey larvae and against economically desirable aquatic life, such as trout, vis-a-vis the prior art 5-nitro-4'-chlorosalicylanilide is shown in Table II above. Note, in particular, that 3-nitro-4'-chlorosalicylanilide is not only effective against the larvae at a concentration 40% lower than the 5-nitro-4'-chlorosalicylanilide but even so has a 50% greater selectivity than the prior art compound; such higher effectiveness and selectivity is not obvious nor expected from the prior art disclosure.

Further 3-nitro-4'-chlorosalicylanilide and 5-nitro-4'-chlorosalicylanilide were screened against the fungi, Trichophyton Mentagrophytes, Candida Albicans, Pencillium Luteum and Epidermorphyton Fluccosum by incorporating various concentrations of the two nitrohalosalicylanilides into the media upon which the fungi were grown on glass plates. This was done by inoculating the test organism into a medium composed of a base of plain agar containing the test compound overlaid by a layer of potato dextrose agar.

When so tested 3-nitro-4'-chlorosalicylanilide exhibited unexpected and unobviously greater activity as a fungicide than did the prior art 5'-nitro,4'-chlorosalicylanilide.

Also the 3-nitro-4'-chlorosalicylanilides of this invention, as shown by the table below, exhibit unpredictable, marked, unexpected and unobvious greater antiradiation activity than the prior art 5-nitro-4'-chlorosalicylanilide when tested in accordance with accepted screening procedures.

LD$_{50}$ of approximately 130 mg/Kg.

Modifications, changes and improvements to the preferred embodiments of the invention herein described may occur to those skilled in the art who come to understand the precepts and principles thereof. Accordingly, the patent to be issued hereon should not be limited in its scope to the specific embodiments of the invention herein described, but by the advance by which the invention has promoted the art.

I claim:

1. A 3-nitrohalosalicylanilide having the formula

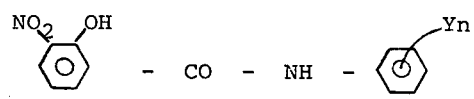

where Y is a halogen and $n$ is a positive integer no greater than 5.

2. A 3-nitrohalosalicylanilide having the formula

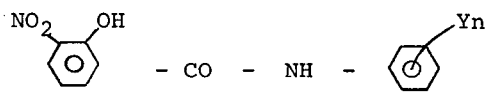

where Y is a halogen and $n$ is a postive integer no greater than 3.

3. The 3-nitrohalosalicylanilide according to claim 2 having the formula

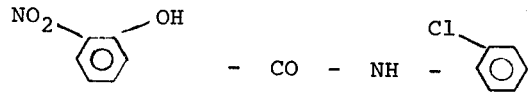

TABLE OF RELATIVE RADIATION ACTIVITY

| Name and Formula of Compound, USAF No. and Vehicle Used for Toxicity and Radiation Tests | Toxicity Approx. LD$_{50}$ in mgm./kgm. | Dose in mgm./kgm. | Radiation Studies X-ray Dose in Roentgene | Change in ST$_{50}$ in Days | Mortality at 30 Days After X-ray |
|---|---|---|---|---|---|
| 3-nitro-4'-chloro-salicylanilide | 15 | 10 | 700 | 0 | 9/10 |
|  |  | 5 | 700 | +2 | 10/10 |
| 5-nitro-4'-chloro-salicylanilide | 40 | 25 | 700 | 0 | 10/10 |
|  |  | 10 | 700 | +4 | 9/10 |

Finally, 3-nitrohalosalicylanilides have a marked, unexpected, unpredictable and unobvious greater toxicity (4 to 1) over the corresponding 5-nitrohalosalicylanilides when evaluated by the intraperitoneal route in rodents (small white rats), exhibiting an LD$_{50}$ of approximately 35 mg./Kg in contrast with an 4. The 3-nitrohalosalicylanilide according to claim 2 having the formula

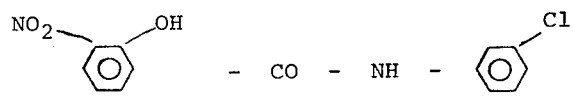

5. The 3-nitrohalosalicylanilide according to claim 2 having the formula
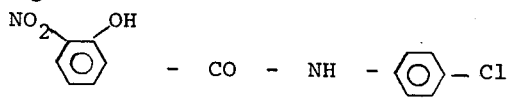
6. The 3-nitrohalosalicylanilide according to claim 2 having the formula
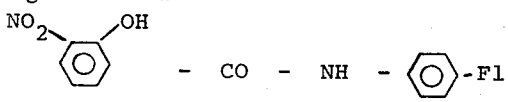
7. The 3-nitrohalosalicylanilide according to claim 2 having the formula
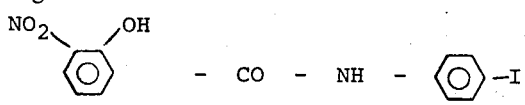
8. The 3-nitrohalosalicylanilide according to claim 2 having the formula
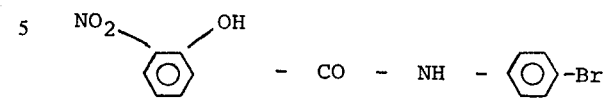
9. A 3-nitrohalosalicylanilide having the formula
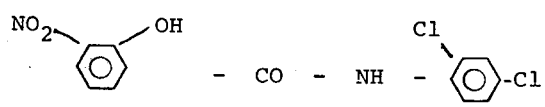
* * * * *